UNITED STATES PATENT OFFICE.

ALFRED HENRY HUTH, OF 17 KENSINGTON SQUARE, COUNTY OF MIDDLESEX, ENGLAND.

MANUFACTURE OF COMPOUNDS OF INDIA-RUBBER, GUTTA-PERCHA, AND LIKE MATERIALS.

SPECIFICATION forming part of Letters Patent No. 326,220, dated September 15, 1885.

Application filed February 23, 1884. (Specimens.)

*To all whom it may concern:*

Be it known that I, ALFRED HENRY HUTH, F. S. A., a subject of the Queen of Great Britain, residing at 17 Kensington Square, in the county of Middlesex, England, gentlemen, have invented certain new and useful Improvements in the Manufacture of Compounds of India-Rubber, Gutta-Percha, and like Materials, and of which the following is a specification.

My invention relates to combining india-rubber or gutta-percha or analogous elastic vegetable products with resins and gums more or less of a brittle nature, for the purpose of reducing the cost of the manufactured product and improving the insulating and mechanical properties for the purpose for which these substances are used.

Various processes have been from time to time devised for obtaining the object of my invention, but they have been, so far as my knowledge extends, more or less unsuccessful in practical application, owing to the fact that the resins or other materials used for admixture with the india-rubber or its equivalent always contain volatile oils, which, if not first separated, cause the manufactured articles made with their admixture with gutta-percha, india-rubber, and the like to become spongy and imperfect at the heat required to be used in the manufacture of the combinations.

In my process I take admixtures of earth-wax and some of the following gums and resins viz: gum-kauri, resin, amber, colophony, gum-anime′, copal, lac, sandarac, mastic, and such analogous resins, and melt them in a jacketed pan or other suitable vessel at a temperature exceeding by, say, 20° Fahrenheit their natural melting-point, and keep them so until the volatile oils, acids, or other matters are driven off, which is easily ascertained by no further fumes being produced. The combined earth-wax and gums or resins are then cooled and ground to a fine powder and mixed with the india-rubber or gutta-percha or like material on spreading rollers or otherwise.

Various proportions of these mixed materials can be combined with india-rubber or gutta-percha or the like with equally varying proportions of sulphur and other extraneous mixtures well known to the trade, which may be used according to the nature of the goods required. True combination in every case takes place without blowing or sponginess if proper attention be paid not to expose the goods in the cure to a higher temperature than the melting-point of the mixed materials that have been added. In this way india-rubber, gutta-percha, and the like can be effectually combined with the cheaper matters above indicated, and these combined mixtures absorb sulphur in nearly the same proportions as pure india-rubber, gutta-percha, and the like.

In practically carrying out my invention I first powder separately the earth-wax, and the gums and resins intended to be used and mix them together in, it may be, the following proportions, viz: No. 1: earth-wax, two; resin, (colophony,) four; kauri, eight; amber, five; or, No. 2: earth-wax, one; colophony, two; kauri, eight; shellac, four; or, No. 3: earth-wax, four; colophony, six; kauri, sixteen; or, No. 4: earth-wax, two; colophony, two; kauri, nine; or, No. 5: earth-wax, two; colophony, two; amber, six; shellac, six; kauri, four. Earth-wax shall be considered as embracing natural paraffine, (manufactured paraffine scale,) ozokerite, or the other homologues of distilled tar of a similar nature. These mixed materials are then placed in a suitable pan and thoroughly fused, either by steam-heat or directly over an open fire, with constant stirring. The fusion is continued until all frothing and fumes have ceased. The thoroughly-incorporated materials are then cooled and thoroughly powdered. These may now be mixed in any suitable proportion with india-rubber or gutta-percha or the like, either with or without sulphur and other extraneous materials commonly used in the india-rubber trade on the spreading rollers or other mechanical appliances. Should sulphur be used in the mixture, the same proportion of sulphur should be employed—viz., about 2 ounces to the pound of mixture, as if the india-rubber, gutta-percha, or the like—were pure.

In the cure or vulcanization it will be found that the mixed materials added to the india-rubber or its equivalent have the effect of fixing the sulphur in the goods permanently.

As analogues of india-rubber and gutta-percha, subject to be treated according to this specification, and which may be regarded as their equivalents, I may comprise the gums resulting from the plant *Siphonia cahuca*, the *Hevea Guianensis*, the *Ficus kilegeosa cautschuc*, the *Jatropha elastica*, the *Ficus indica*, the *Castilliga elastica*, the *Ceropia pelleta*, the *Siphonia elastica*, the *Urceolaria elastica*, *Horncornia elastica speedosa*, the *Ficus elastica*, and the climbing ficuses belonging to the same species, the *Urcoela elastica*, and the inspissated juices of all the order of plants called *Euphorbiacea* and *Julicca*, the *Artocarpus integifolia*, the *Autocarpus lakoocha*, the *Ficus Indica*, *Tsiela Roxburghie*, *Ficus glomerata*, the *Ficus oppositifolia*, the gutta-shea or tallow-tree. Many of the gums resulting from the inspissated juices of some of the above-enumerated plants are now introduced into commerce as "Para india-rubber," "Madagacca india-rubber," "African india-rubber," "South American india-rubber," "gutta-shea," "balata," "gutta-percha," "bastard india-rubber," and "bastard gutta-percha."

I claim—

In the manufacture of rubber or gutta-percha compounds, the improvement or combination produced by mixing earth-wax and gums or resins, fusing them and keeping them in a state of fusion until all matters volatile at the fusing temperature are expelled, then cooling, powdering, and mixing them with india-rubber, gutta-percha, or analogous substance, substantially as set forth.

ALFRED HENRY HUTH.

Witnesses:
 JNO. DEAN,
 GEO. J. B. FRANKLIN,
*Both of 17 Gracechurch Street, London.*